(12) United States Patent
Yoon et al.

(10) Patent No.: US 11,994,739 B2
(45) Date of Patent: May 28, 2024

(54) CAMERA MODULE

(71) Applicant: Samsung Electro-Mechanics Co., Ltd., Suwon-si (KR)

(72) Inventors: Young Bok Yoon, Suwon-si (KR); Nam Ki Park, Suwon-si (KR); Bong Won Jeong, Suwon-si (KR); Bo Sung Seo, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 420 days.

(21) Appl. No.: 16/927,121

(22) Filed: Jul. 13, 2020

(65) Prior Publication Data

US 2021/0199915 A1  Jul. 1, 2021

(30) Foreign Application Priority Data

Dec. 30, 2019  (KR) .................. 10-2019-0177542

(51) Int. Cl.
*G02B 7/02* (2021.01)
*G02B 7/04* (2021.01)
*G03B 13/34* (2021.01)

(52) U.S. Cl.
CPC .............. *G02B 7/04* (2013.01); *G02B 7/021* (2013.01); *G03B 13/34* (2013.01)

(58) Field of Classification Search
CPC . G02B 7/04; G02B 7/021; G02B 7/08; G03B 3/10; G03B 5/02; G03B 13/34; G03B 17/12; G03B 2205/0046; G03B 2205/0069; G03B 30/00; H04N 5/2253; H04N 5/2252; H04N 5/2254

USPC .................................. 359/694–706, 822–826
See application file for complete search history.

(56) References Cited

U.S. PATENT DOCUMENTS

| | | | | |
|---|---|---|---|---|
| 6,166,867 | A | * | 12/2000 | Liu ...................... G11B 7/0932 |
| | | | | 359/813 |
| 10,036,895 | B2 | | 7/2018 | Avivi et al. |
| 2009/0091832 | A1 | * | 4/2009 | Nagai .................. H04N 23/687 |
| | | | | 359/557 |

(Continued)

FOREIGN PATENT DOCUMENTS

| CN | 103890629 A | 6/2014 |
|---|---|---|
| CN | 107092069 A | 8/2017 |

(Continued)

OTHER PUBLICATIONS

Korean Office Action dated Feb. 18, 2021 in counterpart Korean Patent Application No. 10-2019-0177542 (6 pages in English and 5 pages in Korean).

(Continued)

*Primary Examiner* — Mahidere S Sahle
(74) *Attorney, Agent, or Firm* — NSIP Law

(57) ABSTRACT

A camera module includes a lens module accommodating one or more lenses and configured to move in an interior of a housing in an optical axis direction of the one or more lenses, a first support member connected to the lens module and extending toward an upper inner surface of the housing from the lens module in a first direction intersecting the optical axis, and a second support member connected to the first support member and extending toward a lower inner surface of the housing in a second direction intersecting with the optical axis.

20 Claims, 10 Drawing Sheets

(56) References Cited

U.S. PATENT DOCUMENTS

| | | | |
|---|---|---|---|
| 2009/0225453 A1* | 9/2009 | Chang | G02B 7/08 |
| | | | 359/824 |
| 2012/0287318 A1* | 11/2012 | Fujinaga | G02B 7/08 |
| | | | 359/814 |
| 2014/0091204 A1 | 4/2014 | Ezawa et al. | |
| 2016/0131866 A1* | 5/2016 | Kim | G02B 7/08 |
| | | | 359/824 |
| 2018/0120583 A1 | 5/2018 | Avivi et al. | |
| 2018/0120674 A1 | 5/2018 | Avivi et al. | |
| 2019/0004328 A1 | 1/2019 | Lee et al. | |
| 2022/0229348 A1* | 7/2022 | Yu | G02B 7/08 |

FOREIGN PATENT DOCUMENTS

| | | |
|---|---|---|
| CN | 107533208 A | 1/2018 |
| CN | 207937740 U | 10/2018 |
| JP | 2019-2972 A | 1/2019 |
| KR | 10-2010-0001519 A | 1/2010 |
| KR | 10-2017-0126993 A | 11/2017 |
| KR | 10-2017-0128611 A | 11/2017 |
| KR | 10-2019-0121953 A | 10/2019 |

OTHER PUBLICATIONS

Chinese Office Action dated Jul. 13, 2022, in counterpart Chinese Patent Application No. 202011017594.9 (3 pages in English and 6 pages in Chinese).

\* cited by examiner

CAMERA MODULE

CROSS-REFERENCE TO RELATED APPLICATIONS

This application claims the benefit under 35 USC 119(a) of Korean Patent Application No. 10-2019-0177542 filed on Dec. 30, 2019, in the Korean Intellectual Property Office, the entire disclosure of which is incorporated herein by reference for all purposes.

BACKGROUND

1. Field

The present disclosure relates to a camera module configured to increase displacement of a lens module.

2. Description of the Background

A camera module may include one or more lenses for refracting light, to form an image of an object using an image sensor. The lenses of the camera module may be aligned in an optical axis direction. For example, a plurality of the lenses may be aligned on a first optical axis connecting the object and an image surface or a second optical axis connecting a prism and the image surface. A variable magnification function of the camera module may be achieved by moving a plurality of the lenses in the first or second optical axis direction. However, it may be difficult to secure the displacement of the lenses for achieving high magnification when a number of the lenses configuring the camera module is large or an internal space of the housing configuring the camera module is narrow.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module accommodating one or more lenses and configured to move in an interior of a housing in an optical axis direction of the one or more lenses, a first support member connected to the lens module and extending toward an upper inner surface of the housing from the lens module in a first direction intersecting the optical axis, and a second support member connected to the first support member and extending toward a lower inner surface of the housing in a second direction intersecting with the optical axis.

The second support member may be longer than the first support member.

The first support member and the second support member may have different rigidity from each other.

The first support member and the second support member may have a bent portion.

Each of the first support member and the second support member may have a bent portion.

The camera module may further include a connection member connecting the first support member and the second support member.

The connection member may have greater rigidity than the first support member and the second support member.

The connection member may extend in the optical axis direction.

A protrusion and a groove may be disposed on an inner side surface of the housing and in the lens module, respectively, the protrusion and the groove being assembled.

The groove may extend in the optical axis direction.

The camera module may further include an optical path-converting member configured to convert a path of light reflected from a subject to be parallel to the optical axis of the one or more lenses.

The camera module may further include a driving means for driving the lens module in the optical axis direction of the one or more lenses.

The driving means may include a permanent magnet disposed on a side surface of the lens module, and a coil disposed on an inner side surface of the housing facing the permanent magnet.

The first and second support members may include a plurality of first and second support members, and the second support member may be disposed on an outer side of the lens module as compared to the first support member of each respective first and second support member.

Each respective first and second support member may be disposed at a respective corner of the lens module.

In another general aspect, a camera module includes a lens module accommodating one or more lenses, a first support member connected to the lens module and extending in a direction intersecting an optical axis of the one or more lenses, a second support member connected to the first support member and extending in a direction intersecting the optical axis, wherein the first support member is disposed to form an acute angle with respect to the second support member.

The lens module may accommodate a lens of the one or more lenses, comprising a length in a first direction intersecting the optical axis and a length in a second direction intersecting the optical axis and the first direction different from each other.

One or more of the first support member and the second support member may be configured to form an acute angle with respect to the first direction.

The length in the first direction may be less than the length in the second direction, and the first support member may be disposed to form an acute angle with respect to the first direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
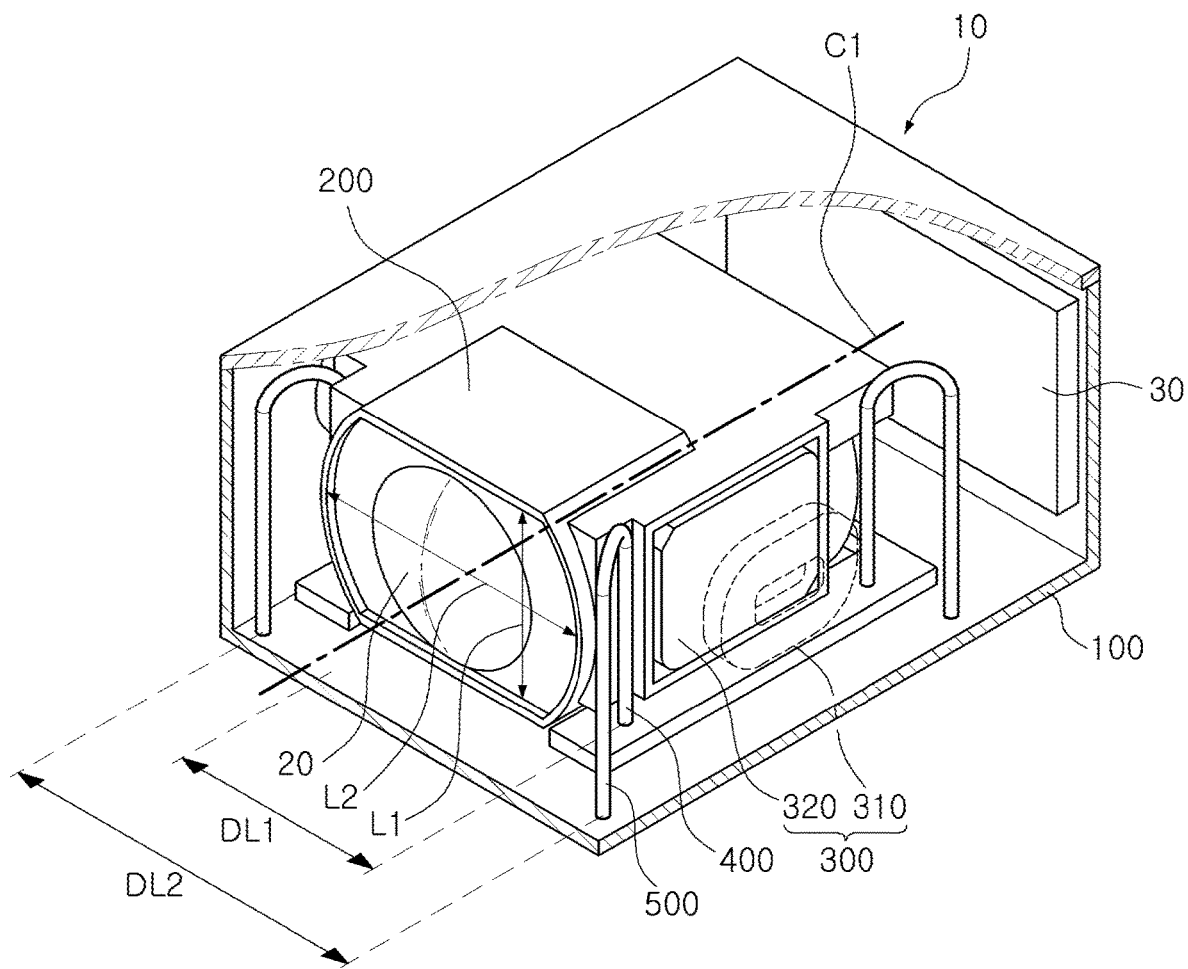
FIG. 1 is a major structural diagram of a camera module according to one or more examples of the present disclosure.

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. As used herein "portion" of an element may include the whole element or less than the whole element.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms, such as "above," "upper," "below," "lower," and the like, may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above," or "upper" relative to another element would then be "below," or "lower" relative to the other element. Thus, the term "above" encompasses both the above and below orientations depending on the spatial orientation of the device. The device may be also be oriented in other ways (rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of this disclosure. Further, although the examples described herein have a variety of configurations, other configurations are possible as will be apparent after an understanding of this disclosure.

Herein, it is noted that use of the term "may" with respect to an example, for example, as to what an example may include or implement, means that at least one example exists in which such a feature is included or implemented while all examples are not limited thereto.

A camera module includes a driving means for moving a lens module. For example, the driving means may be a lens driving circuit. For example, the driving means may include a coil, a magnet, a piezoelectric element, a shape memory alloy, micro-electromechanical system (MEMS), and the like, for moving the lens module in an optical axis direction. The displacement of the lens module may vary depending on functions of the camera module. For example, when the camera module performs focus adjustment, the lens module may be moved slightly. When the camera module performs a variable magnification function, the lens module may be moved significantly. As the camera module mounted on a small terminal has a limited installation space, however, it is difficult to provide sufficient displacement of the lens module. To alleviate this issue, the present disclosure can provide a camera module enabling a large movement of the lens module as well as a small movement thereof.

An aspect of the present disclosure may provide a camera module capable of performing sufficient displacement of a lens or a lens module in a limited space.

Figure 2:
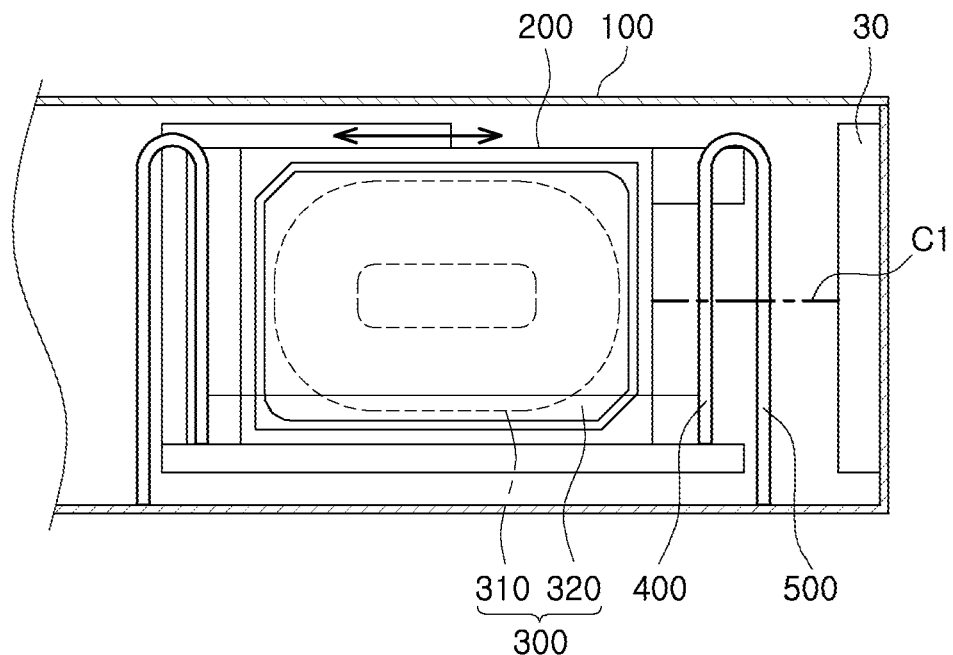
FIG. 2 is a side view of one or more examples of a lens module and a support member illustrated in FIG. 1.
Figure 3:
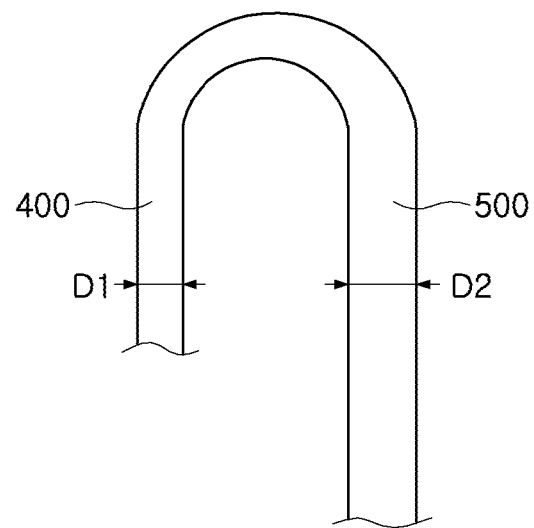
FIG. 3 is an enlarged view of first and second support members illustrated in FIG. 2.

A camera module according to one or more examples of the present disclosure will be described with reference to FIGS. 1 to 3.

A camera module 10 may include a housing 100 and a lens module 200. However, the configuration of the camera module 10 is not limited thereto. For example, the camera module 10 may further include an image sensor 30.

The housing 100 is configured to accommodate the lens module 200. The lens module 200 may accommodate one or more lenses, for example, a lens 20. The housing 100 is formed to be elongated in an optical axis C1 direction. For example, the housing 100, in general, may be formed to have a rectangular parallelepiped shape, but is not limited thereto.

A cross-section (a plane intersecting with the optical axis C1) of the housing 100 may have different lengths in horizontal and vertical directions. For example, the cross-section of the housing 100 may be mostly rectangular. A height (a direction of a short axis length L1 of the lens 20 based on FIG. 1) of the housing 100 may be substantially identical to a long axis length L2 of the lens 20. The housing 100 configured as described in the present example may facilitate slimming of the camera module 100.

The housing 100 may include a driving means 300 for driving the lens module 200. The driving means 300 according to the present example may include a coil 310 and a magnet 320. The coil 310 may be disposed on an inner side surface of the housing 100, and the magnet 320 may be disposed on a side surface of the lens module 200. The coil 310 and the magnet 320 may be disposed to face each other in a stationary state of the lens module 200. The driving means 300 configured as described herein may move the lens module 200 in the optical axis C1 direction through magnetic force generated between the coil 310 and the magnet 320. At least one of the coil 310 and the magnet 320 may be provided to elongate in the optical axis C1 direction. The driving means 300 configured as described herein may generate magnetic force through a long section, thereby extensively moving the lens module 200 in the optical axis C1 direction.

The lens module 200 includes one or more lenses. The one or more lenses may have a certain level of refractive power. For example, the lens 20 of the one or more lenses may have positive refractive power or negative refractive power. The lens 20 configured as described herein may image light incident in the optical axis C1 direction on the image sensor 30.

The lens 20 may be manufactured to have a shape other than circular. For example, as illustrated in FIG. 1, the lens 20 may have a shape in which the short axis length L1 and the long axis length L2 in a first direction and a second direction intersecting the optical axis C1 are different from each other. As such lens 20 can reduce a height (due to the short axis length L1 in the first direction) of the lens module 200, and the camera module 10 may be slimmed. The lens 20 illustrated in FIG. 1 has a shape in which margin portions are partially cut. However, the shape of the lens 20 is not limited to that illustrated in FIG. 1. For example, the shape of the lens 20 may be modified by cutting not only the margin portion, but also cutting an effective portion in which the light is refracted.

The lens module 200 may be disposed in the housing 100. The lens module 200 may be fixed to a lower inner surface of the housing 100 by support members 400 and 500. The lens module 200 may be maintained at a predetermined height from a lower surface of the housing 100. The lens module 200 may be maintained at a predetermined height from the lower surface of the housing 100 by the support members 400 and 500. As the lens module 200 configured as described herein does not come into contact with upper, lower, left and right inner surfaces of the housing 100, the lens module 200 may move freely according to the driving force generated from the driving means 300.

The lens module 200 may move in the optical axis C1 direction. The lens module 200 may move in the optical axis C1 direction by bending or elastic deformation of the support members 400 and 500.

The support members 400 and 500 are configured to support the lens module 200 at a predetermined height. The support members 400 and 500 mostly extend in a direction intersecting the optical axis C1. As illustrated in FIG. 2, the first support member 400 extends from the lens module 200 toward an upper inner surface of the housing 100. The second support member 500 extends from the first support member 400 toward an inner bottom surface of the housing 100. For example, one end of the first support member 400 is connected to the lens module 200, and the other end of the first support member 400 is connected to one end of the second support member 500 while the other end of the second support member 500 is fixed to the lower surface of the housing 100. For reference, a number of the support members 400 and 500 may be increased or decreased as necessary, although four pairs of the support members 400 and 500 are illustrated in FIG. 1 as supporting the lens module 200.

The support members 400 and 500 may be formed of a material or a shape facilitating easy bending deformation or elastic deformation. For example, the support members 400 and 500 may be formed of a metal, but are not limited thereto. The support members 400 and 500 may be configured to have different lengths from each other. For example, the second support member 500 may be formed to be longer than the first support member 400. The support members 400 and 500 may have different degrees of rigidity. For example, a diameter D1 of the first support member 400 may be smaller than a diameter D2 of the second support member 500 as illustrated in FIG. 3. In the case in which materials of the first support member 400 and the second support member 500 are different, however, the diameters thereof may be formed to be substantially identical.

The second support member 500 may be disposed on an outer side of the lens module 200, as compared to the first support member 400. For example, as illustrated in FIG. 1, the second support member 500 may be disposed on the other side from the first support member 400 so as not to hinder movement of the lens module 200 in the optical axis C1 direction. In addition, the second support member 500 may be disposed further in front and further to the rear of the first support member 400, compared to the first support member 400, to facilitate stable support of the lens module 200 as illustrated in FIG. 2. A distance DL2 between the second support members 500 may greater than a distance DL1 between the first support members 400. For example, a distance DL2 between the second support members 500 in a third direction crossing with the optical axis is greater than a distance DL1 between the first support members 400 in the third direction crossing with the optical axis.

Figure 4:
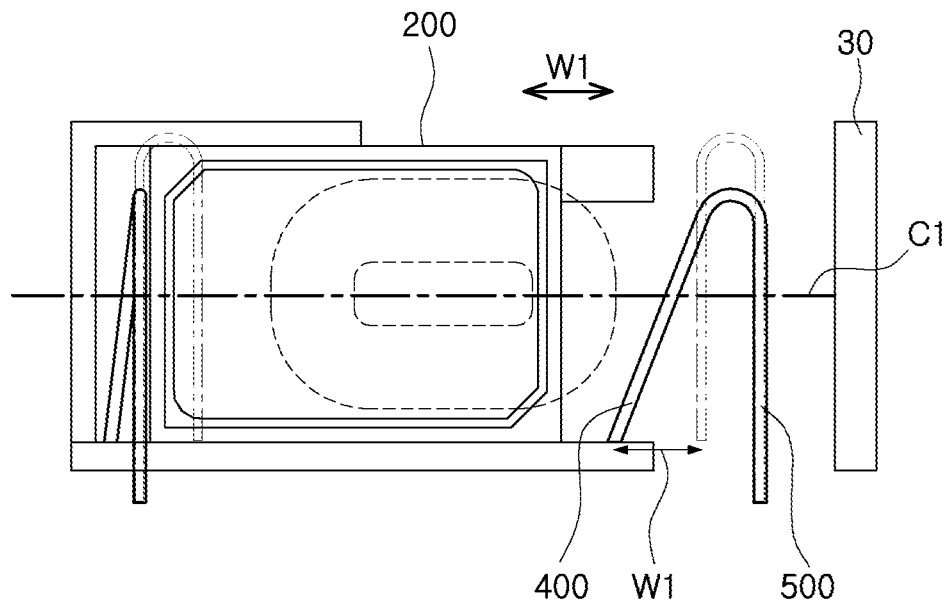
FIGS. 4 and 5 are diagrams illustrating one or more examples of driving states of the lens module illustrated in FIG. 2.
Figure 5:
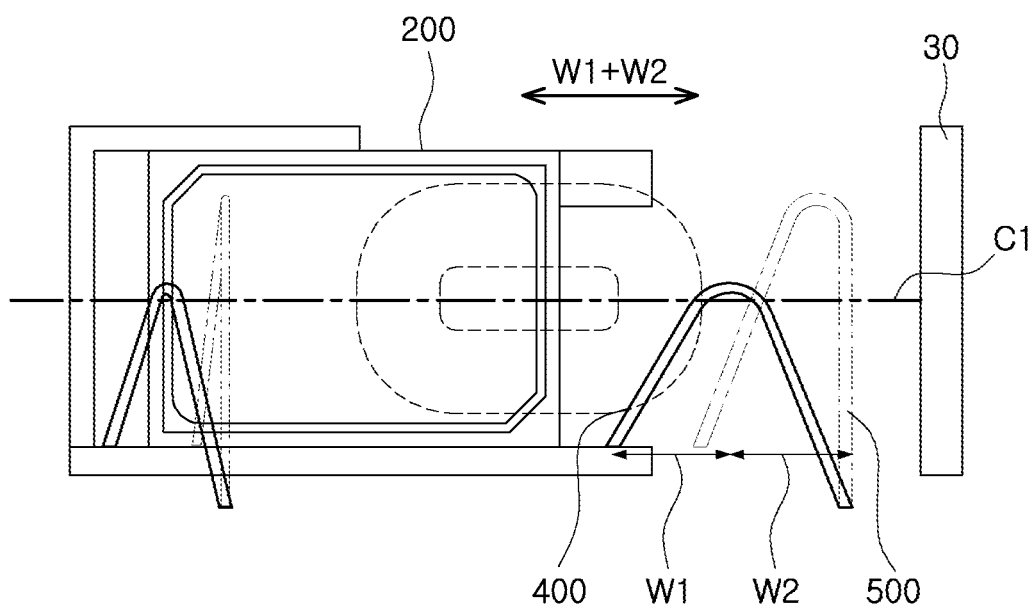

One or more driving states of the camera module will be described with reference to FIGS. 4 and 5.

The camera module 10 may move the lens module 200 to enable focusing and zooming. As an example, the camera module 10, as illustrated in FIG. 4, may move the lens module 200 by first displacement W1 to adjust focus or low magnification. As another example, the camera module 10 may move the lens module 200 by second displacement W1+W2 as illustrated in FIG. 5 for high magnification adjustment. Still as another example, the camera module 10 may move the lens module 200 by third displacement W2 to adjust intermediate magnification.

The camera module 10, configured as described above, may vary the displacement of the lens module 200 in a wide range without increasing a height of the driving means.

A camera module according to one or more other examples of the disclosure will be described. For reference, in the following description, the same components as those described in the above-described examples use the same reference numerals, and further detailed descriptions thereof may be omitted.

Figure 6:
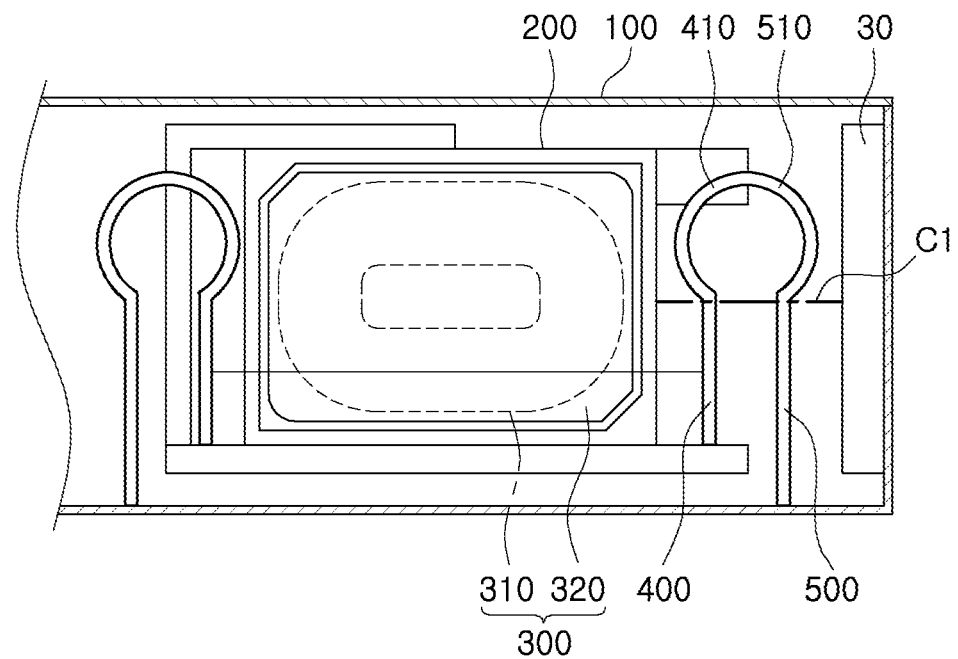
FIG. 6 is a side view illustrating one or more examples of a lens module and a support member upon modification.

A camera module of the present example will be described with reference to FIG. 6.

The camera module 10 according to the present example includes a housing 100 and a lens module 200. The housing 100 may accommodate the lens module 200 and an image sensor 30. The lens module 200 may move inside the housing 100 in an optical axis C1 direction. The lens module 200 may be maintained by support members 400 and 500 at a predetermined height.

The support members 400 and 500 may consist of a first support member 400 and a second support member 500.

The first support member 400 may extend toward an upper inner surface of the housing 100 from the lens module 200. The first support member 400 may include a predetermined bent portion 410. The bent portion 410 may facilitate easy bending deformation and elastic deformation of the first support member 400. In addition, the bent portion 410 may increase a deformation amount of the first support member 400 while lowering an overall height of the first support member 400.

The second support member 500 may extend from the first support member 400 toward an inner bottom surface of the housing 100. The second support member 500 may include a predetermined bent portion 510. The bent portion 510 may facilitate easy bending deformation and elastic deformation of the second support member 500. In addition, the bent portion 510 may increase a deformation amount of the second support member 500 while lowering an overall height of the second support member 500.

The camera module 10 configured as described in the present example may significantly increase a displacement distance of the lens module 200 through the support members 400 and 500 while lowering the heights of the support members 400 and 500 through the bent portions 410 and 510.

A camera module of one or more other examples will be described with reference to FIGS. 7A and 7B.

Figure 7A:
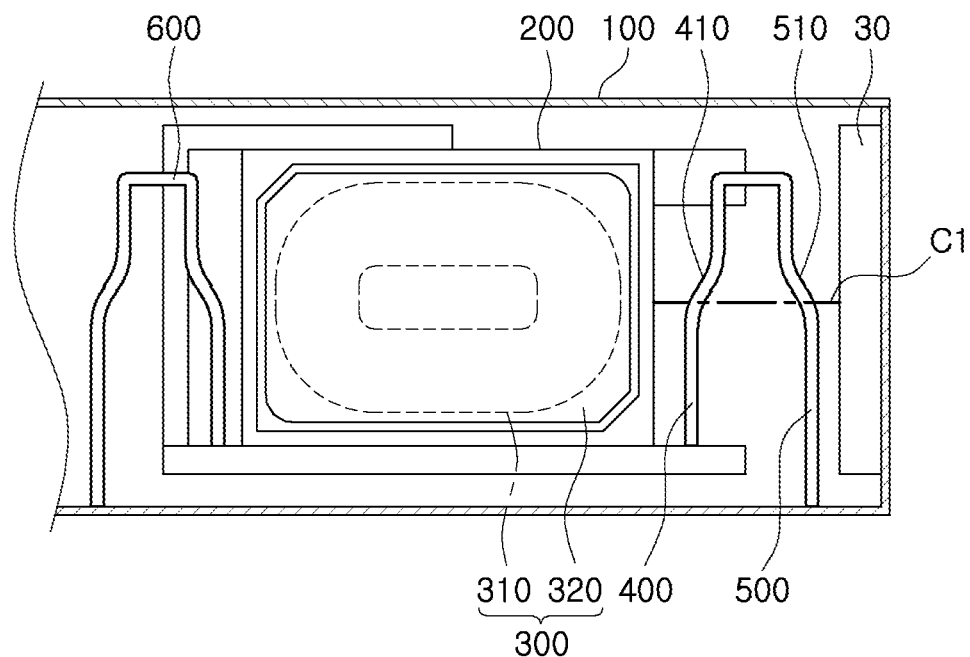
FIGS. 7A and 7B are major structural diagrams of a camera module according to one or more other examples.
Figure 7B:
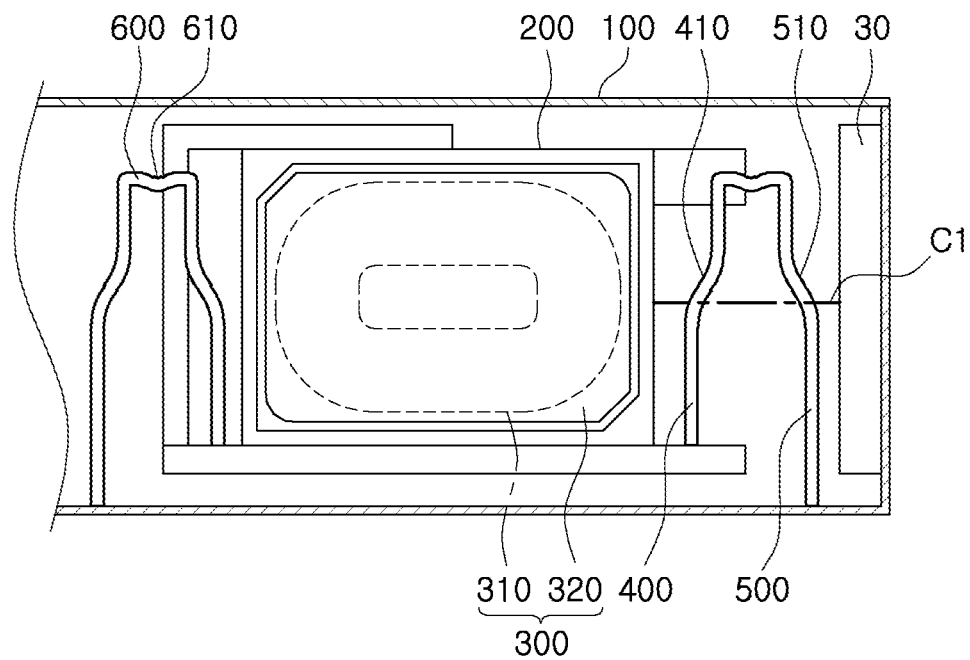

The camera module 10 according to the example illustrated in FIG. 7A includes a housing 100 and a lens module 200. The housing 100 may accommodate the lens module 200 and an image sensor 30. The lens module 200 may move inside the housing 100 in an optical axis C1 direction. The lens module 200 may be maintained by support members 400 and 500 at a predetermined height. The camera module 10 according to the present example may further include a connection member 600 connecting the support members 400 and 500 spaced apart from each other.

The support members 400 and 500 may consist of a first support member 400 and a second support member 500.

The first support member 400 may extend toward an upper inner surface of the housing 100 from the lens module 200. The first support member 400 may include a predetermined bent portion 410. The bent portion 410 may facilitate easy bending deformation and the elastic deformation of the first support member 400. In addition, the bent portion 410 may increase a deformation amount of the first support member 400 while lowering an overall height of the first support member 400. An end of the first support member 400 may be connected to the connection member 600.

The second support member 500 may be configured to connect the connection member 600 and the housing 100. For example, an end of the second support member 500 is connected to the connection member 600 while the other end is fixed to a lower inner surface of the housing. The second support member 500 may include a predetermined bent portion 510. The bent portion 510 may facilitate easy bending deformation and elastic deformation of the second support member 500. In addition, the bent portion 510 may increase a deformation amount of the second support member 500 while lowering an overall height of the second support member 500.

The connection member 600 may be modified in various forms. As an example, the connection member 600 may extend in a direction parallel to the optical axis C1 as illustrated in FIG. 7A. As another example, the connection member 600, as illustrated in FIG. 7B, may include a bent portion 610. The connection member 600 may have greater rigidity as compared to the support members 400 and 500. The rigidity of the connection member 600, however, is not limited thereto. For example, the connection member 600 may be integrally formed with the support members 400 and 500 by injection molding, extrusion molding, or the like.

Figure 8:
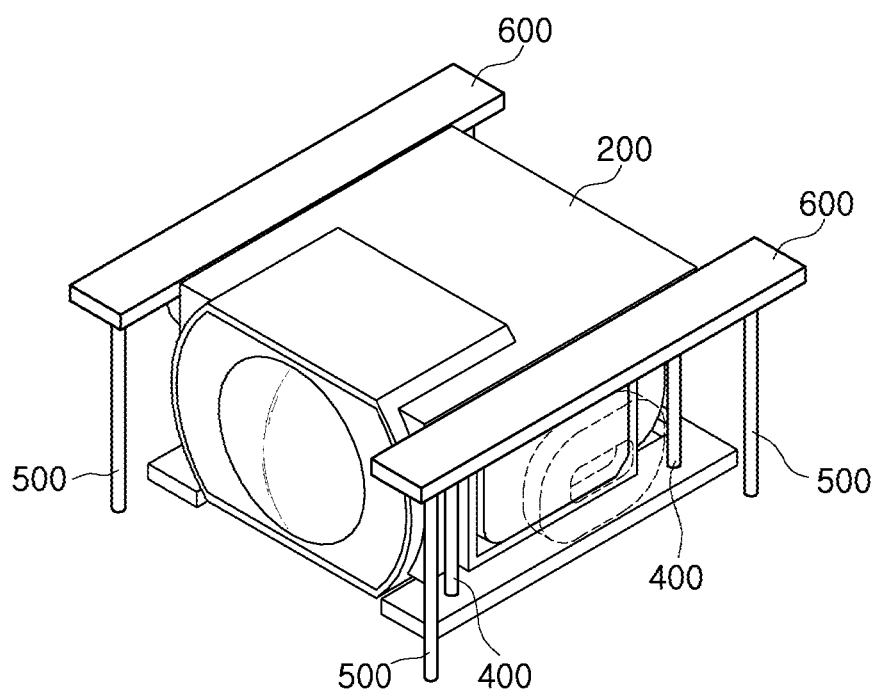
FIG. 8 is a major structural diagram of a camera module according to one or more other examples.

A camera module of according to one or more other examples will be described with reference to FIG. 8.

The camera module 10 according to the present example includes a housing 100 and a lens module 200. The housing 100 may accommodate the lens module 200 and an image sensor 30. The lens module 200 may move inside the housing 100 in an optical axis C1 direction. The lens module 200 may be maintained by support members 400 and 500 at a predetermined height. A plurality of the support members 400 and 500 may be connected by a connection member 600.

The connection member 600 may extend in a length direction of the lens module 200. The connection member 600 may connect a plurality of the first support members 400 and a plurality of the second support members 500. For example, a connection member 600 disposed on a right side of the lens module 200 may integrally connect the second support member 500 and the first support member 400 disposed on the right side of the lens module 200, and that disposed on a left side of the lens module 200 may integrally connect the second support member 500 and the first support member 400 disposed on the left side of the lens module 200.

Figure 9A:
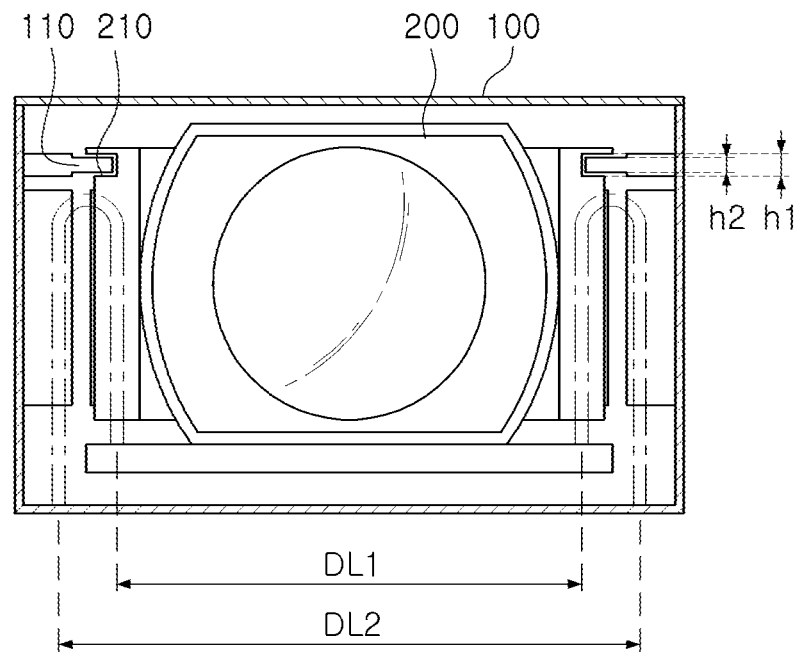
FIGS. 9A and 9B are major structural diagrams of a camera module according to one or more other examples.
Figure 9B:
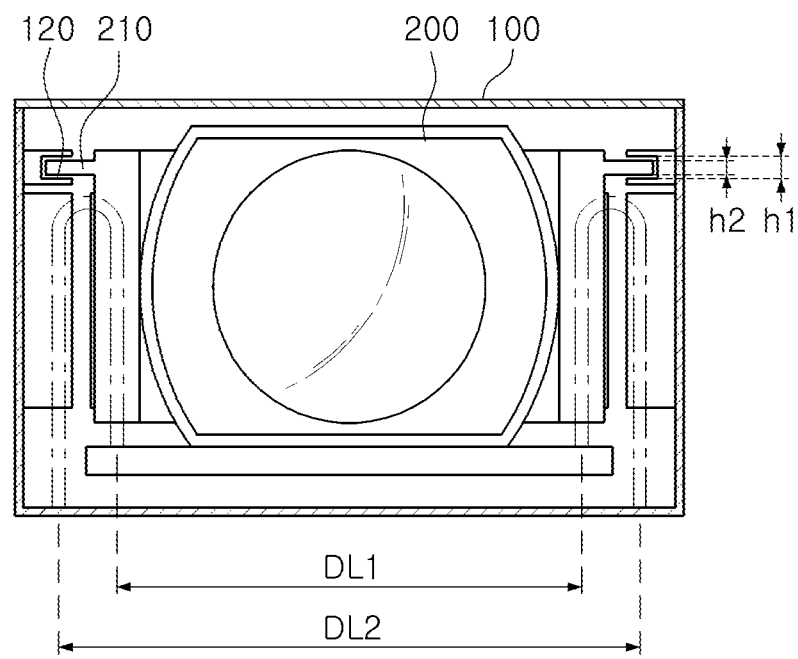

A camera module according to one or more other examples will be described with reference to FIGS. 9A, 9B, and 10.

The camera module 10 includes a housing 100 and a lens module 200. The housing 100 may accommodate the lens module 200 and an image sensor 30. The lens module 200 may move inside the housing 100 in an optical axis C1 direction. The lens module 200 may be maintained by support members 400 and 500 at a predetermined height.

The camera module 10 according to the present example may further include a protrusion and a groove enabling a stable linear movement of the lens module 200. The protrusion and the groove may be formed in the optical axis direction. The protrusion and the groove may be formed in the housing 100 and the lens module 200. As an example, as illustrated in FIG. 9A, the protrusion 110 may be formed in the housing 100 while the groove 210 is formed in the lens module 200. As another example, as illustrated in FIG. 9B and FIG. 10, the protrusion 220 may be formed in the lens module 200 while the groove 120 is formed in the housing 100. The protrusion and the groove may be formed to have different widths. For example, a width h1 of the groove may be larger than a width h2 of the protrusion. In the meantime, as illustrated in FIG. 9A and FIG. 9B, a distance DL2 between the second support members 500 may greater than a distance DL1 between the first support members 400.

Figure 10:
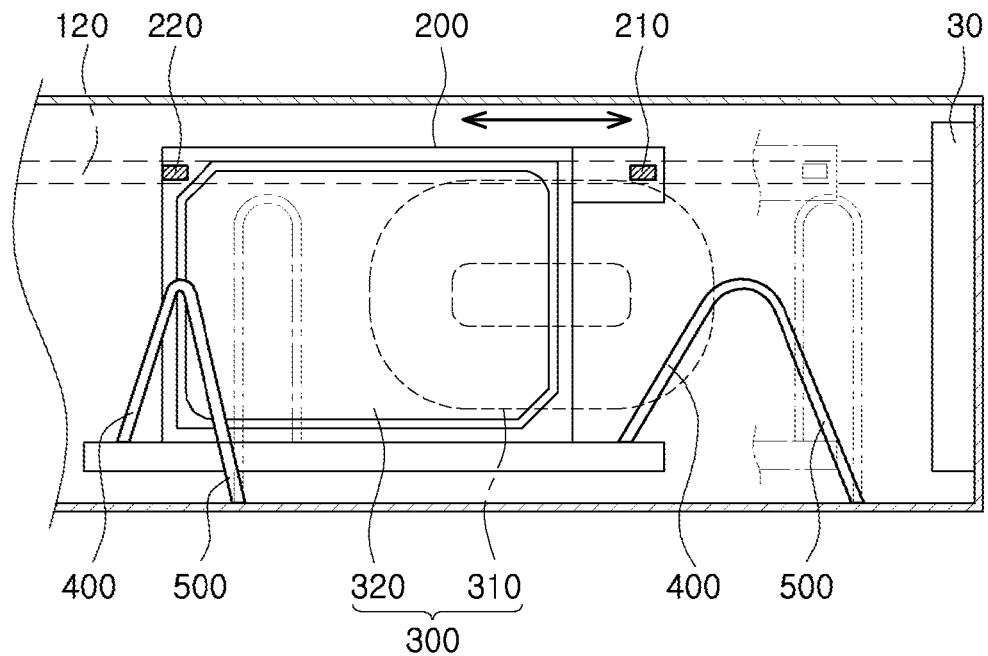
FIG. 10 is a diagram illustrating one or more examples of a driving state of the camera module illustrated in FIGS. 9A and 9B.

Movement of the lens module 200 may be guided by the groove 110 and the protrusion 210 as illustrated in FIG. 10, the camera module configured as described herein may enable stable optical axis movement of the lens module 200.

Figure 11:
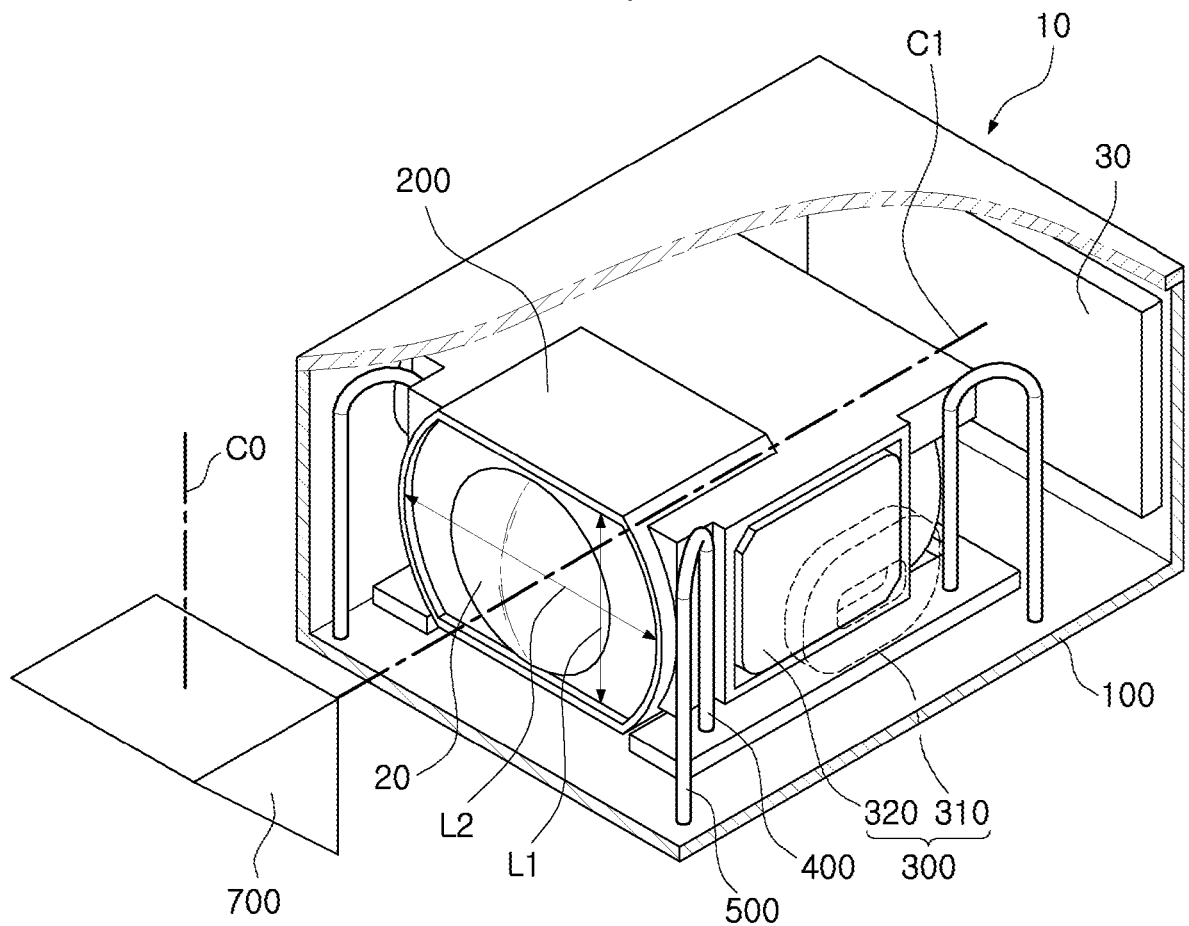
FIG. 11 is a major structural diagram of a camera module according to one or more other examples.

A camera module according to one or more other examples will be described with reference to FIG. 11.

The camera module may include a housing 100 and a lens module 200. The housing 100 may accommodate the lens module 200 and an image sensor 30. The lens module 200 may move inside the housing 100 in an optical axis C1 direction. The lens module 200 may be maintained by support members 400 and 500 at a predetermined height. The camera module 10 according to the present example may include an optical path-converting member. For example, the camera module 10 may further include a prism 700. The optical path-converting member, however, is not limited to the prism. For example, a reflective mirror may be employed as another form of the optical path-converting member.

The prism 700 may be accommodated in the housing 100. The prism 700, as illustrated in FIG. 11, may convert a path of light incident through an optical axis C0 to the optical axis C1 direction connected to the image sensor 30.

Figure 12:
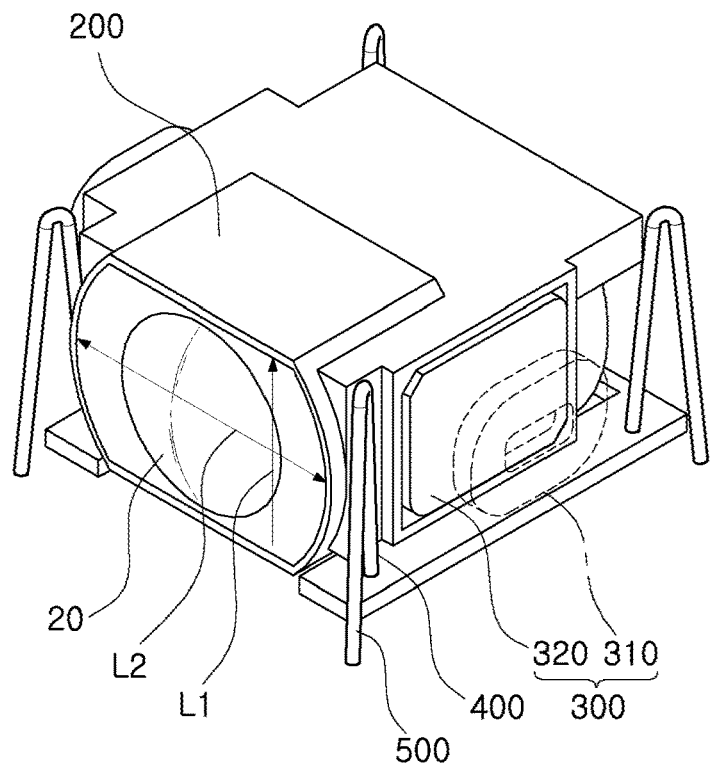
FIG. 12 is a major structural diagram of a camera module according one or more other examples.

A camera module according to one or more other examples will be described with reference to FIGS. 12 to 14.

The camera module may include a housing 100 and a lens module 200. The housing 100 may accommodate the lens module 200 and an image sensor 30. The lens module 200 may move inside the housing 100 in an optical axis C1 direction. The lens module 200 may be maintained by support members 400 and 500 at a predetermined height. The lens module 200 may include at least one lens 20.

The lens 20 may be manufactured to have a shape other than circular. For example, as illustrated in FIG. 12, the lens 20 may have a shape in which a short axis length L1 and a long axis length L2 in a first direction and a second direction intersecting the optical axis C1 are different from each other. As such lens 20 can reduce a height (due to the short axis length L1 in the first direction) of the lens module 200, and the camera module 10 may be slimmed. The lens 20 illustrated in FIG. 12 has a shape in which margin portions are partially cut. However, the shape of the lens 20 is not limited to that illustrated in FIG. 12. For example, the shape of the lens 20 may be modified by cutting not only the margin portion, but also cutting an effective portion in which the light is refracted.

Figure 13:
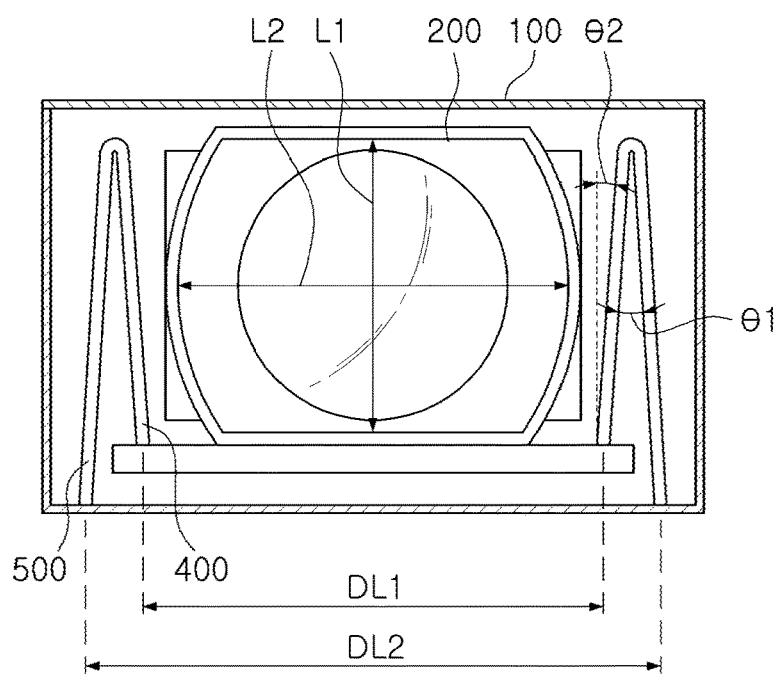
FIG. 13 is a front view illustrating the camera module illustrated in FIG. 12.

For the camera module 10 according to the present example, the first support member 400 may be disposed to form a first angle θ1 with respect to the second support member 500 as illustrated in FIG. 13. Further, the first support member 400 may be disposed to form a second angle θ2 with respect to the first direction in the short axis length L1 direction of the lens. The first angle θ1 and the second angle θ2 may be determined in the range of acute angles. For example, the first angle θ1 and the second angle θ2 may be less than 30°, but are not limited thereto. For example, the first angle θ1 and the second angle θ2 may be substantially identical, but the present examples are not limited thereto.

Figure 14:
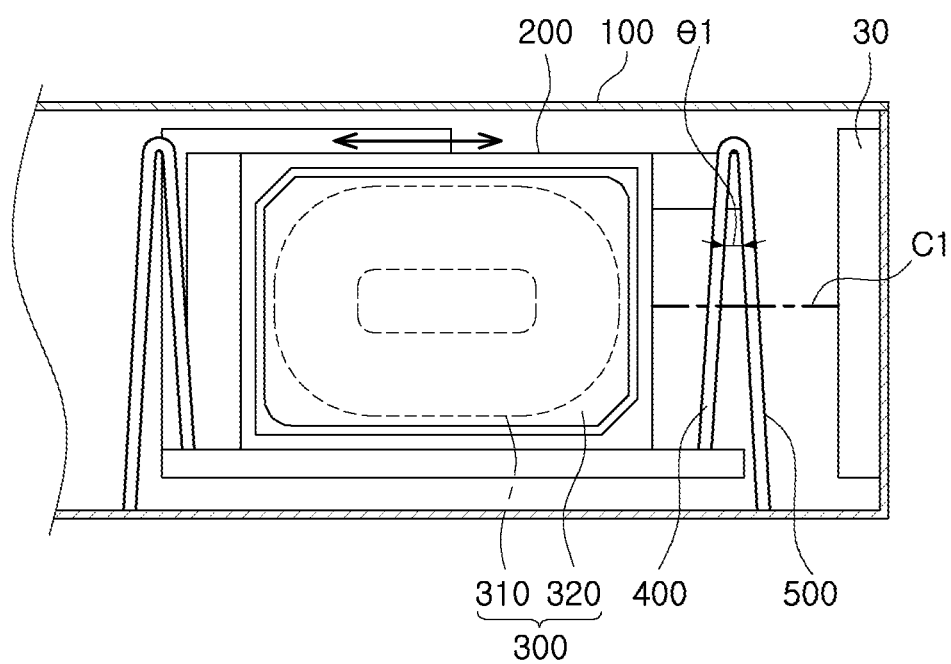
FIG. 14 is a side view illustrating the camera module illustrated in FIG. 12.

As illustrated in FIGS. 13 and 14, the first support member 400 may be farther away from the lens module 200 toward an upper direction. In contrast, the second support member 500 may be farther away from the lens module 200 toward a lower direction. The support members 400 and 500 configured as described herein are configured to press the lens module 200 at four corners, thus, unnecessary movements and shaking of the lens module 200 may be inhibited. In the meantime, a distance DL2 between the second support members 500 may greater than a distance DL1 between the first support members 400.

As set forth above, the examples of the present disclosure facilitate increased displacement of a lens module in an optical axis direction and improve a variable magnification function of a camera module through the same.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
    a lens module accommodating one or more lenses and configured to move in an interior of a housing in an optical axis direction of the one or more lenses;
    a first support member connected to the lens module and extending from a first planar surface toward an inner surface of the housing from the lens module in a first direction intersecting the optical axis, the first support member having a bent portion; and
    a second support member connected to the first support member and extending from a second planar surface different from the first planar surface toward another inner surface of the housing in a second direction intersecting with the optical axis, the second support member having a bent portion,
    wherein a maximum distance between the second support member and another second support member in a third direction crossing with the optical axis is greater than a maximum distance between the first support member and another first support member in the third direction crossing with the optical axis.

2. The camera module of claim 1, wherein the second support member is longer than the first support member.

3. The camera module of claim 1, wherein the first support member and the second support member comprise different rigidity from each other.

4. The camera module of claim 1, wherein each of the bent portion of the first support member and the bent portion of the second support member has a curvature.

5. The camera module of claim 4, wherein each of the first support member and the second support member comprises a bent portion.

6. The camera module of claim 1, further comprising a connection member connecting the first support member and the second support member.

7. The camera module of claim 6, wherein the connection member comprises greater rigidity than the first support member and the second support member.

8. The camera module of claim 6, wherein the connection member extends in the optical axis direction.

9. The camera module of claim 1, wherein a protrusion and a groove are disposed on an inner side surface of the housing and in the lens module, respectively, where the protrusion and the groove are assembled.

10. The camera module of claim 9, wherein the groove extends in the optical axis direction.

11. The camera module of claim 1, further comprising an optical path-converting member configured to convert a path of light reflected from a subject to be parallel to the optical axis of the one or more lenses.

12. The camera module of claim 1, further comprising a driving means for driving the lens module in the optical axis direction of the one or more lenses.

13. The camera module of claim 12, wherein the driving means comprises:
a permanent magnet disposed on a side surface of the lens module; and
a coil disposed on an inner side surface of the housing facing the permanent magnet.

14. The camera module of claim 1, wherein the first and second support members comprise a plurality of first and second support members, and
wherein the second support member is disposed on an outer side of the lens module as compared to the first support member of each respective first and second support member.

15. The camera module of claim 14, wherein each respective first and second support member is disposed at a respective corner of the lens module.

16. A camera module, comprising:
a lens module accommodating one or more lenses;
a first support member connected to the lens module and extending from a first planar surface in a direction intersecting an optical axis of the one or more lenses, the first support member having a bent portion; and
a second support member connected to the first support member and extending from a second planar surface different from the first planar surface in a direction intersecting the optical axis, the second support member having a bent portion,
wherein the first support member is disposed to form an acute angle with respect to the second support member, and
a maximum distance between the second support member and another second support member in a third direction crossing with the optical axis is greater than a maximum distance between the first support member and another first support member in the third direction crossing with the optical axis.

17. The camera module of claim 16, wherein the lens module accommodates a lens of the one or more lenses, comprising a length in a first direction intersecting the optical axis and a length in a second direction intersecting the optical axis and the first direction different from each other.

18. The camera module of claim 17, wherein one or more of the first support member and the second support member are configured to form an acute angle with respect to the first direction.

19. The camera module of claim 18, wherein the length in the first direction is less than the length in the second direction, and
wherein the first support member is disposed to form an acute angle with respect to the first direction.

20. The camera module of claim 1, wherein the bent portion of the first support member is configured to lower an overall height of the first support member, and the bent portion of the second support member is configured to lower an overall height of the second support member.

* * * * *